United States Patent
Chowdhury et al.

(10) Patent No.: US 10,839,246 B2
(45) Date of Patent: Nov. 17, 2020

(54) SYSTEMS AND METHODS FOR END-TO-END HANDWRITTEN TEXT RECOGNITION USING NEURAL NETWORKS

(71) Applicant: Tata Consultancy Services Limited, Mumbai (IN)

(72) Inventors: Arindam Chowdhury, Gurgaon (IN); Lovekesh Vig, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 19 days.

(21) Appl. No.: 16/507,385

(22) Filed: Jul. 10, 2019

(65) Prior Publication Data

US 2020/0026951 A1    Jan. 23, 2020

(30) Foreign Application Priority Data

Jul. 19, 2018 (IN) .............................. 201821026934

(51) Int. Cl.
| G06K 9/00 | (2006.01) |
| G06K 9/46 | (2006.01) |
| G06K 9/62 | (2006.01) |
| G06T 3/40 | (2006.01) |

(52) U.S. Cl.
CPC ......... *G06K 9/4604* (2013.01); *G06K 9/6256* (2013.01); *G06K 9/6262* (2013.01); *G06T 3/40* (2013.01)

(58) Field of Classification Search
None
See application file for complete search history.

(56) References Cited

U.S. PATENT DOCUMENTS

| 9,881,208 | B2 | 1/2018 | Savchenkov et al. |
| 10,262,235 | B1 * | 4/2019 | Chen .................. G06K 9/00422 |
| 2018/0137350 | A1 | 5/2018 | Such et al. |
| 2018/0329883 | A1 * | 11/2018 | Leidner ............... G06F 16/2237 |
| 2019/0095753 | A1 * | 3/2019 | Wolf .................... G06K 9/6217 |

FOREIGN PATENT DOCUMENTS

| CA | 2963808 | 10/2017 |
| CN | 108509881 | 9/2018 |
| WO | WO-2017/163230 | 9/2017 |

* cited by examiner

*Primary Examiner* — Atiba O Fitzpatrick
(74) *Attorney, Agent, or Firm* — Finnegan, Henderson, Farabow, Garrett & Dunner LLP

(57) ABSTRACT

The present disclosure provides systems and methods for end-to-end handwritten text recognition using neural networks. Most existing hybrid architectures involve high memory consumption and large number of computations to convert an offline handwritten text into a machine readable text with respective variations in conversion accuracy. The method combine a deep Convolutional Neural Network (CNN) with a RNN (Recurrent Neural Network) based encoder unit and decoder unit to map a handwritten text image to a sequence of characters corresponding to text present in the scanned handwritten text input image. The deep CNN is used to extract features from handwritten text image whereas the RNN based encoder unit and decoder unit is used to generate converted text as a set of characters. The disclosed method requires less memory consumption and less number of computations with better conversion accuracy over the existing hybrid architectures.

11 Claims, 7 Drawing Sheets

SYSTEMS AND METHODS FOR END-TO-END HANDWRITTEN TEXT RECOGNITION USING NEURAL NETWORKS

PRIORITY CLAIM

This U.S. patent application claims priority under 35 U.S.C. § 119 to Indian Patent Application No. 201821026934, filed on Jul. 19, 2018. The entire contents of the aforementioned application are incorporated herein by reference.

TECHNICAL FIELD

The disclosure herein generally relates to handwritten text recognition in offline mode, and, more particularly, to systems and methods for end-to-end handwritten text recognition using neural networks.

BACKGROUND

Offline Handwritten Text Recognition (HTR) from scanned handwritten text images is an important problem for enterprises attempting to digitize large volumes of handwritten scanned documents or reports in the present digital world. The offline Handwritten Text Recognition (HTR) is considerably more challenging compared to online mode which exploits attributes like stroke information and trajectory in addition to a text image, whereas offline mode has only the text image of the document/report available for feature extraction.

Technically, Handwritten Text Recognition (HTR) has been formulated as a sequence matching problem where a sequence of features extracted from input data such as a line of text of the document or report is matched to an output sequence composed of characters from text equivalent of the input data, primarily using Hidden Markov Models (HMMs). However, the Hidden Markov Models (HMMs) fail to make use of context information in an input text sequence, due to Markovian assumption that each observation depends only on a current state. Recurrent Neural Networks (RNNs) addressed this problem of using context information in the input text sequence, which encodes the context information in hidden states. Nevertheless, use of Recurrent Neural Networks (RNNs) is limited to scenarios in which individual characters in a sequence may be segmented, as RNN objective functions require a separate training signal at each timestep.

Various improved systems and models are available in the art based on hybrid architecture combining HMMs with RNNs. Use of Connectionist Temporal Classification (CTC) in combination with RNNs proved to be an effective solution, where Connectionist Temporal Classification (CTC) allows a network to map the input sequence directly to a sequence of output labels, thereby doing away with a need of a segmented input. However, performance of a RNN-CTC model is still limited with use of handcrafted features from the scanned handwritten text image to construct the input sequence to the RNN.

Multi-Dimensional Recurrent Neural Network (MDRNN) is known as first end-to-end model for Handwritten Text Recognition (HTR) which uses hierarchy of multi-dimensional RNN layers that processes an input text image along two axes thereby learning long term dependencies in both directions. In Multi-Dimensional Recurrent Neural Network (MDRNN), spatial structure of characters are captured along with a vertical axis while encoding sequence information along a horizontal axis. However, a formulation is computationally expensive as compared to standard convolution operations which extract same visual features. A composite architecture that combines a Convolutional Neural Network (CNN) with a deep one-dimensional RNN-CTC model provide better performance on standard Handwritten Text Recognition (HTR) benchmarks, However, an efficient way of Handwritten Text Recognition (HTR) with better accuracy, less memory consumption and less number of computations is always an area of improvement.

SUMMARY

Embodiments of the present disclosure present technological improvements as solutions to one or more of the above-mentioned technical problems recognized by the inventors in conventional systems.

In an aspect, there is provided a system for end-to-end handwritten text recognition using neural networks, the system comprising: one or more internal data storage devices operatively coupled to one or more hardware processors for storing instructions configured for execution by the one or more hardware processors, the instructions being comprised in: an image pre-processing module configured to: receive a scanned handwritten text input image; obtain one or more sub-images from the scanned handwritten text input image, wherein each of the one or more sub-images comprises a line of handwritten text present in the scanned handwritten text input image; and scale the one or more sub-images into one or more scaled sub-images having a fixed height and a variable width and maintaining aspect ratio thereof; a feature extraction module operatively coupled to the image pre-processing module and configured to transform each of the one or more scaled sub-images into one or more feature maps by applying a Convolutional Neural Network (CNN), wherein the one or more feature maps contain visual features of a corresponding sub-image; a map-to-sequence module operatively coupled to the feature extraction module and configured to convert the one or more feature maps into a sequence of feature vectors by detaching depth-wise, columns comprised in the one or more feature maps and concatenating respective columns of the one or more feature maps of the corresponding sub-image; a sequence learning module operatively coupled to the map-to-sequence module and configured to generate one or more set of characters, by mapping the visual features associated with each sequence of feature vectors, using a recurrent neural network (RNN) based encoder unit and decoder unit, wherein the one or more set of characters is a machine readable text recognized for the corresponding sub-image, and wherein an encoder unit of the RNN based encoder unit and decoder unit is configured to generate a context vector for each sequence of feature vectors and a decoder unit of the RNN based encoder unit and decoder unit is configured to apply a conditional probability distribution over the context vector for each sequence of feature vectors, to generate a set of characters for the corresponding sub-image; and an image post-processing module operatively coupled to the sequence learning module and configured to combine the set of characters for each of the corresponding sub-image to generate a handwritten text output file, wherein the hand-written text output file is a recognized text version of the scanned handwritten text input image.

In another aspect, there is provided a processor implemented method for end-to-end handwritten text recognition using neural networks, the method comprising the steps of: pre-processing, by an image pre-processing module, a received scanned handwritten text input image, wherein the pre-processing comprises: obtaining one or more sub-images from the received scanned handwritten text input image, wherein each sub-image comprises a line of handwritten text present in the scanned handwritten text input image; and scaling the one or more sub-images into one or more scaled sub-images having a fixed height and a variable width and maintaining aspect ratio thereof; transforming, by a feature extraction module, each of the one or more scaled sub-images into one or more feature maps by applying a Convolutional Neural Network (CNN), wherein the one or more feature maps contain visual features of a corresponding sub-image; converting, by a map-to-sequence module, the one or more feature maps into a sequence of feature vectors by detaching depth-wise, columns comprised in the one or more feature maps and concatenating respective columns of the one or more feature maps of the corresponding sub-image; generating, by a sequence learning module, one or more set of characters, by mapping the visual features associated with each sequence of feature vectors, using a recurrent neural network (RNN) based encoder unit and decoder unit, wherein the one or more set of characters is a machine readable text recognized for the corresponding sub-image, and wherein an encoder unit of the RNN based encoder unit and decoder unit is configured to generate a context vector for each sequence of feature vectors and a decoder unit of the RNN based encoder unit and decoder unit is configured to apply a conditional probability distribution over the context vector for each sequence of feature vectors, to generate a set of characters for the corresponding sub-image; and post-processing, by an image post-processing module, the set of characters, wherein the post-processing comprises combining the set of characters for each of the corresponding sub-image to generate a handwritten text output file, wherein the hand-written text output file is a recognized text version of the scanned handwritten text input image.

In yet another aspect, there is provided a computer program product comprising a non-transitory computer readable medium having a computer readable program embodied therein, wherein the computer readable program, when executed on a computing device, causes the computing device to: pre-process a received scanned handwritten text input image by an image pre-processing module, wherein the pre-process comprises: obtaining one or more sub-images from the received scanned handwritten text input image, wherein each sub-image comprises a line of handwritten text present in the scanned handwritten text input image; and scaling the one or more sub-images into one or more scaled sub-images having a fixed height and a variable width and maintaining aspect ratio thereof; transform each of the one or more scaled sub-images by a feature extraction module, into one or more feature maps by applying a Convolutional Neural Network (CNN), wherein the one or more feature maps contain visual features of a corresponding sub-image; convert the one or more feature maps by a map-to-sequence module, into a sequence of feature vectors by detaching depth-wise, columns comprised in the one or more feature maps and concatenating respective columns of the one or more feature maps of the corresponding sub-image; generate one or more set of characters by a sequence learning module, by mapping the visual features associated with each sequence of feature vectors, using a recurrent neural network (RNN) based encoder unit and decoder unit, wherein the one or more set of characters is a machine readable text recognized for the corresponding sub-image, and wherein an encoder unit of the RNN based encoder unit and decoder unit is configured to generate a context vector for each sequence of feature vectors and a decoder unit of the RNN based encoder unit and decoder unit is configured to apply a conditional probability distribution over the context vector for each sequence of feature vectors, to generate a set of characters for the corresponding sub-image; and post-process the set of characters by an image post-processing module, wherein the post-process comprises combining the set of characters for each of the corresponding sub-image to generate a handwritten text output file, wherein the hand-written text output file is a recognized text version of the scanned handwritten text input image.

In an embodiment of the present disclosure, the image pre-processing module is further configured to: employ a mini-batch training technique, to maintain uniformity in dimensions by padding the one or more sub-images comprised in a batch with respective background pixels on both left and right sides to match width of a widest sub-image in the batch; and introduce random distortions to the one or more sub-images to generate variations in the one or more sub-images.

In an embodiment of the present disclosure, the CNN comprises seven convolutional layers stacked serially with leaky ReLU activations, wherein the leaky ReLU activations of the convolution layers are configured by performing: batch normalization to prevent internal covariate shift and speed up the training before propagating to a next convolutional layer; and pooling operations mechanism to perform on the activation of at least some of the convolutional layers to reduce dimensionality of the one or more sub-images.

In an embodiment of the present disclosure, the encoder unit is a bidirectional network formed by combining two Long Short Term Memory (LSTM) cells and the decoder unit is a unidirectional network having a single LSTM cell.

In an embodiment of the present disclosure, the encoder unit and the decoder unit comprises two recurrent layers with 256 hidden units in each of the LSTM cells.

In an embodiment of the present disclosure, the RNN based encoder unit and decoder unit is configured by: facilitating gradient flow to a subsequent recurrent layer through recurrent units comprised therein through residual connections; regularizing the encoder unit without modifying recurrent connections to capture long-term dependencies by employing a dropout mechanism along depth-wise connections; activating cell neurons to prevent the covariate shift due to mini batch training through a layer normalization; and aligning hidden states of the decoder unit with hidden states of the encoder unit through an attention mechanism.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
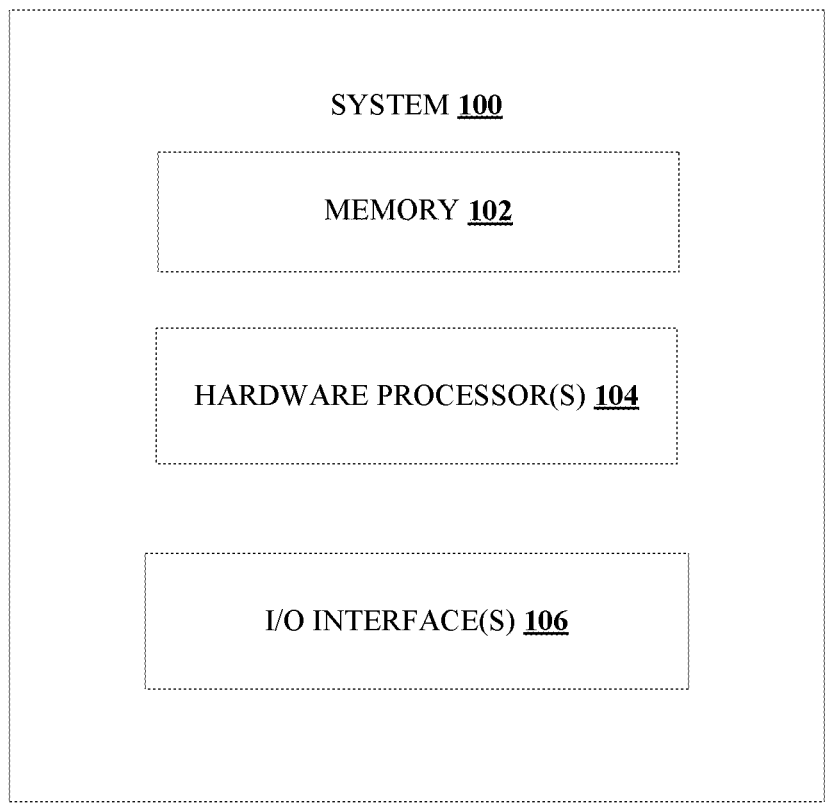
FIG. 1 illustrates an exemplary block diagram of a system for end-to-end handwritten text recognition using neural networks, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the claims (when included in the specification).

Terminologies like character, text and sequence are interchangeably used depending on the context, to indicate text present in a scanned handwritten text input image before or after the conversion. An output sequence refer to a recognized text after the conversion.

Off-line Handwritten Text Recognition (HTR) has been a major research problem for several decades and has gained recent impetus due to the potential value that can be unlocked from extracting the data stored in handwritten documents and exploiting it using modern AI systems. Deep recurrent neural network (RNN) models such as Multi-dimensional Long Short Term Memory (LSTM) cells proved to yield superior performance for efficient handwritten text recognition over traditional Hidden Markov Model based approaches that suffer from Markov assumptions and therefore lack a representational power of RNNs. The disclosed systems and methods for end-to-end handwritten text recognition combine a deep Convolutional Neural Network (CNN) with a RNN based encoder unit and decoder unit to map a handwritten text image to a sequence of characters corresponding to text present in the scanned handwritten text input image. The deep CNN is used to extract features from the handwritten text image whereas the RNN based encoder unit and decoder unit is used to generate converted text as a set of characters.

Referring now to the drawings, and more particularly to FIG. 1 through 5, where similar reference characters denote corresponding features consistently throughout the figures, there are shown preferred embodiments and these embodiments are described in the context of the following exemplary systems and methods for end-to-end handwritten text recognition using neural networks.

FIG. 1 illustrates an exemplary block diagram of a system 100 for end-to-end handwritten text recognition using neural networks, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (102A through 102E of FIG. 2) of the system 100 can be stored in the memory 102.

Figure 2:
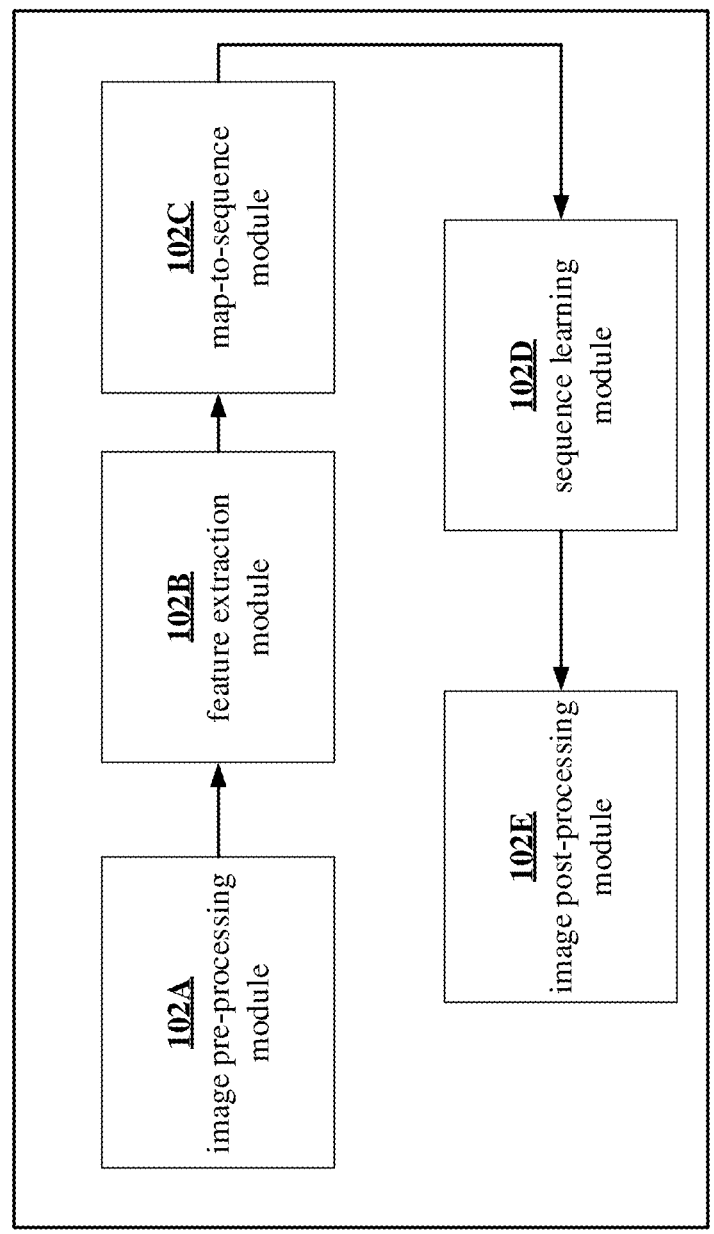
FIG. 2 is an exemplary architecture of functional modules comprised in the system of FIG. 1, in accordance with an embodiment of the present disclosure.

FIG. 2 illustrates an exemplary architecture of functional modules comprised in the system 100 of FIG. 1, in accordance with an embodiment of the present disclosure. In an embodiment, the functional modules include an image pre-processing module 102A, a feature extraction module 102B, a map-to-sequence module 102C, a sequence learning module 102D, and an image post-processing module (102E).

Figure 3A:
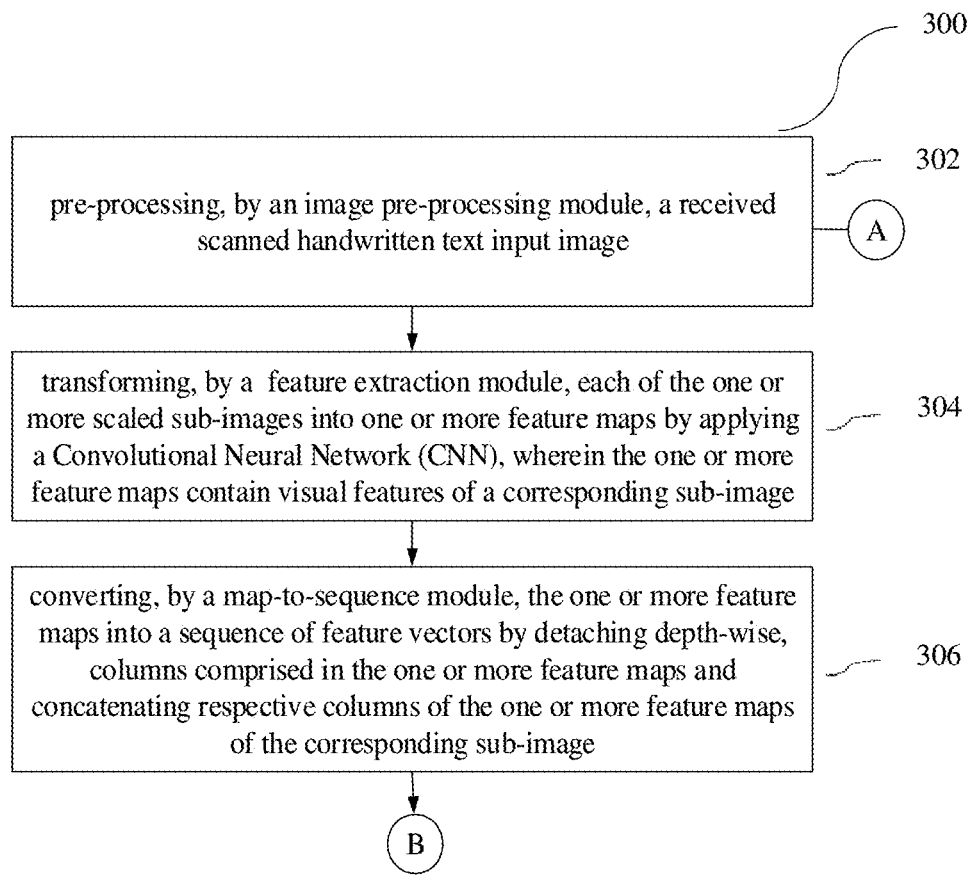
FIGS. 3A, 3B, and 3C illustrate a flow diagram of a processor implemented method for end-to-end handwritten text recognition using neural networks, in accordance with an embodiment of the present disclosure.
Figure 3B:
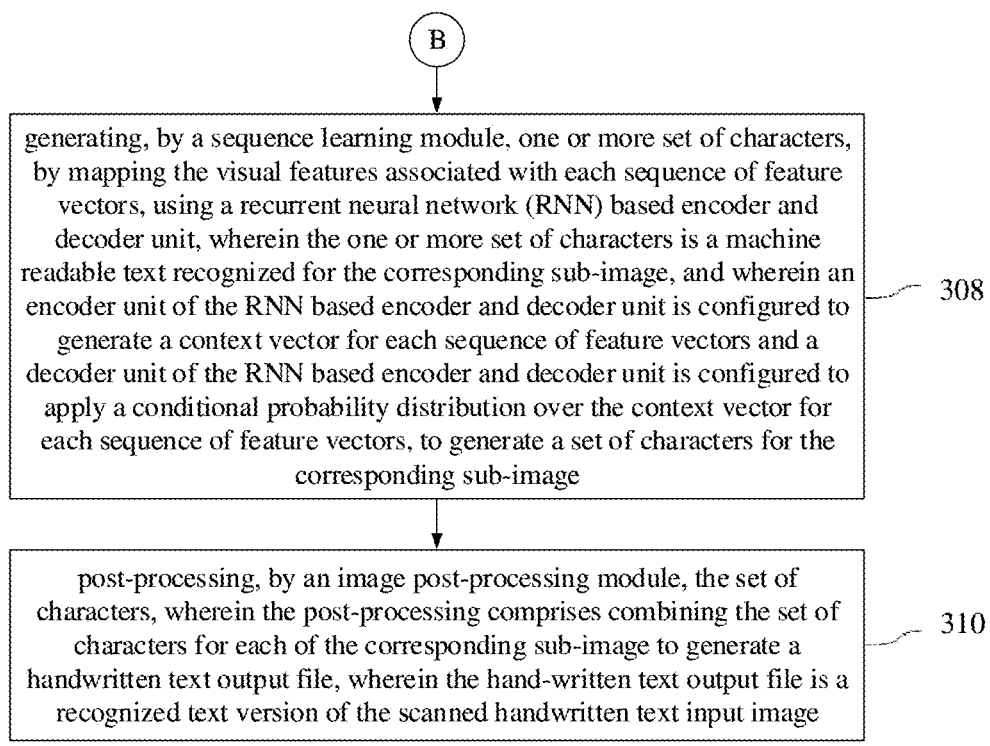
Figure 3C:
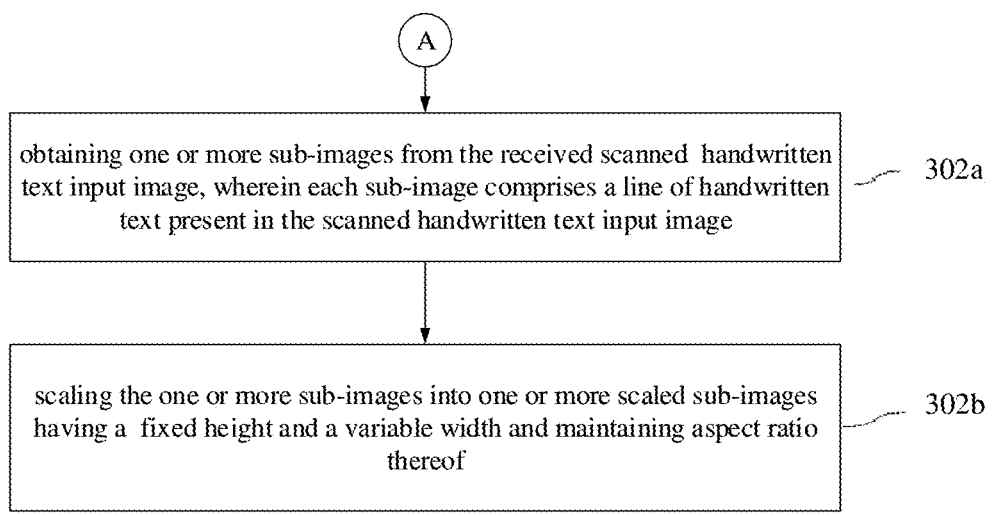

FIGS. 3A through 3C illustrate a flow diagram of a processor implemented method 300 for end-to-end handwritten text recognition using neural networks, in accordance with an embodiment of the present disclosure. In an embodiment, the one or more data storage devices or memory 102 operatively coupled to the one or more processors 104 is configured to store instructions configured for execution of steps of the method 300 by the one or more processors 104. The steps of the method 300 will now be explained in detail with reference to the components of the system 100 of FIG. 1 and the functional modules of the exemplary architecture of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In accordance with an embodiment of the present disclosure, an image pre-processing module (102A of FIG. 2) is configured to pre-process, at step 302, a received scanned handwritten text input image. The step 302 of pre-processing comprises: obtaining one or more sub-images from the received scanned handwritten text input image at step 302a, wherein each sub-image comprises a line of handwritten text present in the scanned handwritten text input image and further scaling, at step 302b, the one or more sub-images into one or more scaled sub-images having a fixed height and a variable width and maintaining aspect ratio.

In an embodiment, the received scanned handwritten text input image may be a file or a document which may be scanned or processed by a standard scanning apparatus such a scanner, multi-function peripheral (MFP) device, image copying device and a like. The received scanned handwritten text input image may comprise at least one line of handwritten text that is to be recognized or converted into a digital or machine readable text. The received scanned handwritten text input image is divided into one or more sub-images at step 302a, by the image pre-processing module (102A of FIG. 2), wherein each sub-image comprises a line of handwritten text present in the scanned handwritten text input image. In an embodiment, the line of handwritten text comprised in each sub-image may or may not be a complete sentence.

In an embodiment, the one or more sub-images are scaled or down sampled at step 302b, by the image pre-processing module (102A of FIG. 2) with a fixed height and a variable width and maintaining the aspect ratio. In an embodiment, each sub-image contains a single channel with 256 intensity levels and the fixed height may range from 128 pixels to 32 pixels. However the width of the each sub-image is adjusted to maintain the aspect ratio of corresponding sub-image to reduce number of computations and memory requirements of the system 100 as shown in Table 1.

TABLE 1

| Size of sub-image | Computations (Tflops) | Memory (GB) |
|---|---|---|
| 128 × W | $1.5 \times 10^4$ | 9.5 |
| 32 × W' | $5.9 \times 10^3$ | 7.9 |

In an embodiment, the step 302 of pre-processing further comprises employing a mini-batch training technique, to maintain uniformity in dimensions by padding the one or more sub-images comprised in a batch with respective background pixels on both left and right sides to match width of a widest sub-image in the batch and introducing random distortions to the one or more sub-images to generate variations in the one or more sub-images. In an embodiment, the random distortions are introduced in each sub-image in the batch while employing the mini-batch training technique, by performing a set of four transformation operations that include translation, rotation, shear and scaling. A parameters while performing the set of four transformation operations are sampled independently using a Gaussian distribution. For example the parameter for rotation operation is an amount of angle. Similarly, the parameter for scaling operation is an amount of resolution. In an embodiment, at least one from the set of four transformation operations or none from the set of four transformation operations may be performed on the one or more sub-images to generate the variations, so that the system 100 may process a previously unseen set of sub-images in every iteration.

In accordance with an embodiment of the present disclosure, a feature extraction module (102B of FIG. 2) is configured to transform, at step 304, each of the one or more scaled sub-images into one or more feature maps by applying a Convolutional Neural Network (CNN), wherein the one or more feature maps contain visual features of the corresponding sub-image.

In an embodiment, the Convolutional Neural Network (CNN) may be a standard Convolutional Neural Network (CNN) without fully-connected layers. The CNN is used to extract rich visual features from each scaled sub-image in the form of one or more feature maps by automatically learning a set of essential non-linear transformations. The extracted rich visual features may encode local attributes in the corresponding sub-image while preserving spatial organization of objects that are present in the corresponding sub-image.

In an embodiment, the CNN comprises seven convolutional layers stacked serially, with Leaky ReLU activations. In an embodiment, first six layers of the CNN comprises a kernel size of 3×3 pixels with 1 pixel wide input padding while a seventh layer comprises a kernel size of 2×2 pixels without input padding. Kernel strides are of 1 pixel in both vertical and horizontal directions of the seven convolutional layers in the CNN.

In an embodiment, the leaky ReLU activations of the seven convolution layers are configured by performing a batch normalization to prevent internal covariate shift and speed up a training before propagating to a subsequent convolutional layer and a pooling operations mechanism for activation of the convolutional layers to reduce dimensionality of the one or more sub-images.

In an embodiment, the pooling operations mechanism comprises total of four max-pooling layers, two of which have a kernel size of 2×1 to preserve horizontal spatial distribution of handwritten text present in each sub-image and rest of two max-pooling layers have standard 2×2 non-overlapping kernel size. Table 2 shows a network configuration of each convolutional layer in the CNN.

TABLE 2

| Configuration | Layers 1-2-3-4-5-6-7 |
|---|---|
| Convolution Filters | 16-32-64-64-128-128-128 |
| Maxpool(2 × 2) | ✓- ✓- X- X- X- X- X |
| Maxpool(2 × 1) | X- X- X- X- ✓- ✓- X |

According to the Table 2, a first convolution layer contains 16 convolution filters, a second convolution layer contains 32 convolution filters, a third and a forth convolution layers contain 64 convolution filters each, and a fifth, a six and a seventh convolution layers contain 128 convolution filters each. The first convolution layer and the second convolution layer comprises a max-pooling layer with 2×2 non-overlapping kernel size whereas the fifth convolution layer and the sixth convolution layer comprises a max-pooling layer with 2×1 kernel size.

In an embodiment, each sub-image of the received scanned handwritten text input image is inverted by the image pre-processing module (102A of FIG. 2) before being sent to the feature extraction module (102B of FIG. 2), so that foreground of the each sub-image is composed of higher intensity on a dark background for Convolutional Neural Networks (CNNs) activations to learn easily.

In accordance with an embodiment of the present disclosure, a map-to-sequence module (102C of FIG. 2) is configured to convert, at step 306, the one or more feature maps into a sequence of feature vectors by detaching depth-wise, columns comprised in the one or more feature maps and concatenating respective columns of the one or more feature maps of the corresponding sub-image.

Figure 4:
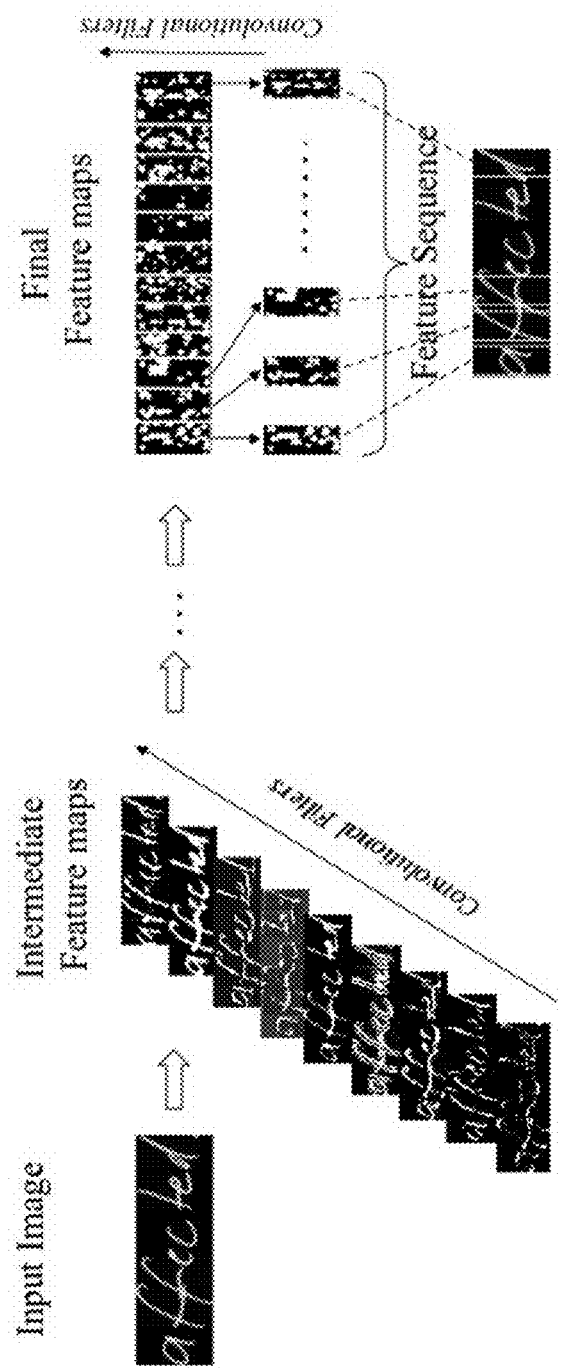
FIG. 4 is a graphical representation showing generation of a sequence of feature vectors from feature maps of each sub-image of a scanned handwritten text input image using a Convolutional Neural Network (CNN), according to an embodiment of the present disclosure.

In an embodiment, the sequence of feature vectors are constructed by concatenating respective columns of the one or more feature maps. In an embodiment, an $i^{th}$ feature vector is constructed by concatenating $i^{th}$ columns of the one or more feature maps. Due to translational invariance of convolution operations performed by the CNN at step 304, each column represents a vertical strip (termed as receptive field), moving from left to right, as shown in FIG. 4. Due to the scaling of each sub-image at step 302, by the image pre-processing module (102A of FIG. 2), the sequence of feature vectors comprises unique dimensions without putting any restriction on sequence length of each feature vector.

In accordance with an embodiment of the present disclosure, a sequence learning module (102D of FIG. 2) is configured to generate, at step 308, one or more set of characters, by mapping the visual features associated with each sequence of feature vectors, using a recurrent neural network (RNN) based encoder unit and decoder unit. The one or more set of characters is a machine readable text recognized for the corresponding sub-image. An encoder unit of the RNN based encoder unit and decoder unit is configured to generate a context vector for each sequence of feature vectors. A decoder unit of the RNN based encoder unit and decoder unit is configured to apply a conditional probability distribution over the context vector for each sequence of feature vectors, to generate a set of characters for the corresponding sub-image.

In an embodiment, both the encoder unit and the decoder unit of the RNN based encoder unit and decoder unit act as separate recurrent neural networks. The encoder unit constructs a compact representation in the form of the context vector based on an understanding of the sequence of feature vectors of each sub-image obtained at step 306 and the decoder unit generates the set of digitized characters or machine readable text for the corresponding sub-image by applying the conditional probability distribution on the same compact representation.

In an embodiment, the encoder unit takes as input, the sequence of feature vectors of each sub-image, $X=(x_1, \ldots, x_{T_s})$, where $T_s$ is a sequence length, and generates a context vector c for the corresponding sub-image, which is representative of entire sequence, such that, at each timestep t, a hidden state $h_t=g(x_t, h_{t-1})$ and finally, $c=s(h_1, \ldots, h_{T_s})$, where g and s are some non-linear functions.

In an embodiment, Long Short Term Memory (LSTM) cells are used in the encoder unit to learn long-term dependencies due to presence of a memory cell $c \in \mathbb{R}^n$. In an embodiment, a single Long Short Term Memory (LSTM) cell consists of four gates, a forget f, an input i, an update u and an output o, which modify cell state $c_t$ at each timestep, by selectively accumulating and discarding information in a way that a final cell state encodes only relevant components of the sequence of feature vectors. At each timestep t, the cell and the hidden states are updated as, $c_t = f_t \circ c_{t-1} + i_t \circ u_t$ and, $h_t = o_t \circ \tanh(c_t)$ where, $f_t = \sigma(W^f x_t + U^f h_{t-1})$ $i_t = \sigma(W^i x_t + U^i h_{t-1})$ $u_t = \tanh(W^u x_t + U^u h_{t-1})$ $o_t = \sigma(W^o x_t + U^o h_{t-1})$, where, $\sigma()$ and $\tanh()$ represent element wise sigmoid and tanh operations while W and U are parameters of a linear transformation. The final cell state $c_{T_s}$ is used as the context vector for the corresponding sub-image.

Figure 5:
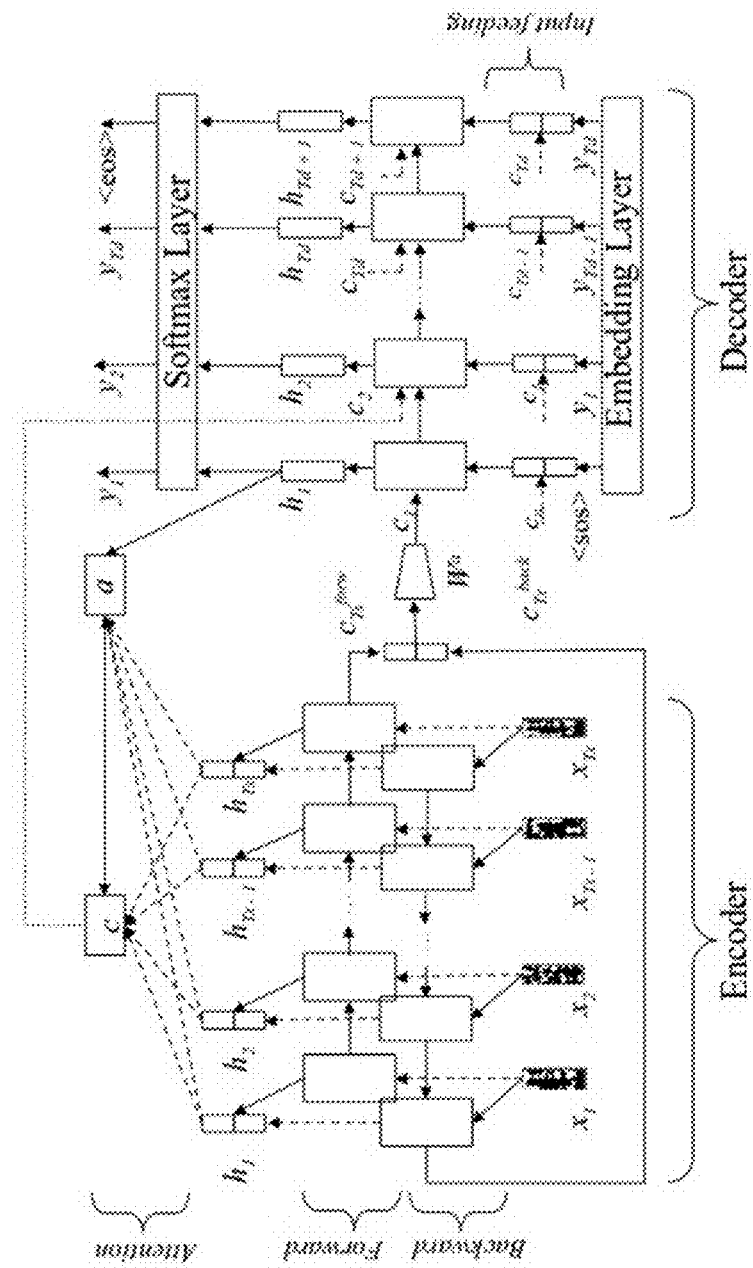
FIG. 5 is a graphical representation showing recognition of hand written text for each sub-image of a scanned handwritten text input image using a Recurrent Neural Network (RNN) based encoder unit and decoder unit with attention, according to an embodiment of the present disclosure.

In an embodiment, the encoder unit is a bidirectional network. As LSTM cells are unidirectional and may only learn past context, the bidirectional network is formed by combining two LSTM cells, to utilize both forward and backward dependencies in the sequence of feature vectors. The bidirectional network processes the sequence of feature vectors in opposite directions, as shown in FIG. 5. An output of two LSTM cells, forward $\overrightarrow{h_t}$ and backward $\overleftarrow{h_t}$ are concatenated at each timestep, to generate a single output vector $h_t = [\overrightarrow{h_t} \; \overleftarrow{h_t}]$. Similarly, the final cell state is formed by concatenating final forward and backward states $c_{T_s} = [\overrightarrow{c_{T_s}}; \overleftarrow{c_{T_s}}]$.

In an embodiment, the context vector $c_{T_s}$ generated by the encoder unit is provided as an input to the decoder unit for the corresponding sub-image. The decoder unit is a unidirectional network having a single LSTM cell.

In an embodiment, an affine transformation, $c_1 = W^a c_{T_s}$, where $W^a$ is a transformation matrix, $c_1$ is used to initialize a cell state of the decoder unit. The decoder unit generates a token $y_t$ of an output sequence at each timestep t, conditioned on $c_1$ and own previous predictions $\{y_1, \ldots, y_{t-1}\}$. The decoder unit learns a conditional probability distribution $p(y) = \prod_{t=1}^{T_d} p(y_t | \{y_t, \ldots, y_{t-1}\}, c_1)$ over the output sequence $y = \{y_1, \ldots, y_{T_d}\}$, where $T_d$ is a sequence length. Using the decoder unit, each conditional is modelled as $p(y_t | \{y_t, \ldots, y_{t-1}\}, c1) = \text{softmax}(g(y_{t-1}, h_{t-1}, c_1))$, where g is a non-linear function and $h_{t-1}$ is a hidden state of the decoder unit.

In an embodiment, both the encoder unit and the decoder unit comprise two recurrent layers each with 256 hidden units in each of the LSTM cells, and extends to a depth of two layers to enhance learning capacity.

In an embodiment, the RNN based encoder unit and decoder unit is configured by residual connections to facilitate gradient flow to a subsequent recurrent layer through recurrent units comprised therein. A dropout mechanism is employed along depth-wise connections to regularize the encoder unit without modifying the recurrent connections to capture long-term dependencies. A layer normalization is employed to activate cell neurons to prevent the covariate shift due to minibatch training. Also an attention mechanism is employed for aligning hidden states of the decoder unit with hidden states of the encoder unit.

In an embodiment, the dropout mechanism is employed to preserve a capacity of the RNN based encoder unit and decoder unit to capture long-term dependencies. In an embodiment, the layer normalization is employed for recurrent activations in the RNN based encoder unit and decoder unit to stabilize hidden state dynamics and for better convergence during training of the system 100. A linear transformation $W \in \mathbb{R}^{256 \times N}$ is applied on the decoder unit to generate logits, where N is an output vocabulary size. A Softmax operation is performed on the logits to define a probability distribution over the output vocabulary at each timestep. In an embodiment, the output vocabulary size is number of letters present in a language along with special characters such as space, asterisk etc. . . . . . In an embodiment, the output vocabulary size for English language handwritten text recognition is 79 that includes 26 letters and 53 special characters.

In an embodiment, the attention mechanism such as a Bandanau attention mechanism is employed as an extension to the RNN based encoder unit and decoder unit due to which, the context vector is modified at each timestep based on similarity of decoder unit previous hidden state $h_{t-1}^{decoder}$ with sequence of an notations $\{h_1^{encoder}, \ldots, h_{T_s}^{encoder}\}$ generated by the encoder unit, for the sequence of feature vectors. In an embodiment, the attention mechanism is used due to a fact that the context vector that forms a link between the encoder unit and the decoder unit may tend to forget essential information especially for long sequences. In an embodiment, the long sequences may contain more than one handwritten text sentences. The context vector at a $i^{th}$ decoder timestep is given by, $$c_i = \sum_{j=1}^{T_s} \alpha_{ij} h_j^{encoder}$$

A weight $\alpha_{ij}$ for each $h_j^{encoder}$ is given as $$\alpha_{ij} = \frac{\exp(e_{ij})}{\sum_{k=1}^{T_s} \exp(e_{ik})}$$

where $e_{ij} = a(h_{i-1}^{decoder}, h_j^{encoder})$

Here, a is a feedforward network trained along with CNN of the feature extraction module (102B of FIG. 2) and RNN based encoder unit and decoder unit of the sequence learning module (102D of FIG. 2).

Therefore, the context vector is modified as a weighted sum of input annotations, where weights measure how similar the output of the decoder unit at position i is with the feature vector from the sequence feature vectors around position j of the sequence of feature vector. An attention input feeding approach used in Luong attention mechanism is also employed due to which the context vector from previous timestep is concatenated with the input of the current timestep to further augment a predictive capacity of the system 100.

In an embodiment, the system 100 is trained by minimizing a cumulative categorical cross-entropy (CE) loss which is calculated independently for each predicted character in the output sequence. For the output sequence $y=\{y_1, \ldots, y_{T_d}\}$, the CE loss is defined as $CE(y)=-\Sigma_{t-1}^{T_d} \log(p(y_t))$ where $p(y_t)$ is a probability of true class at timestep t.

In an embodiment, an input to the decoder unit at each timestep is an embedding vector from a learnable embedding layer, corresponding to gold prediction from previous step, until an end-of-sequence <eos> is emitted. A gradient descent is performed across the RNN based encoder unit and decoder unit using Back Propagation Through Time (BPTT) followed by back propagation into the CNN to update the network weights and biases.

In an embodiment, a Focal Loss technique is employed by assigning suitable weights to contribution of each instance in final CE loss to address class imbalance problem that arises from the CE loss. The final CE loss is defined as $FL(p)=-(1-p)^Y \log(p)$, where p is a true-class probability and y is a tunable focusing parameter.

In an embodiment, an inference of the system 100 is derived using a Greedy Decoding (GD) which emits class with a highest probability from softmax distribution at each timestep, as the output at that instance. The Greedy Decoding operates with underlying assumption that a best sequence is composed of most likely tokens at each timestep, which may not necessarily be true.

In an embodiment, a Beam Search decoding algorithm is used to find a best sequence by maximizing a joint distribution, over a set of hypotheses, known as a beam. The joint distribution is given by $$p(y_1, y_2, \ldots, y_{T_d}) = p(y_1) \times p(y_2|y_1) \times p(y_3|\{y_1, y_2\}) \times \ldots \times p(y_{T_d}|\{y_1, y_2, \ldots, y_{T_d-1}\})$$

The Beam Search decoding algorithm selects top-K classes, where K is a beam size, at first timestep and obtains an output distribution individually for each of them at next timestep. Out of K×N hypotheses, where N is an output vocabulary size, top-K classes are chosen based on product $p(y_1) \times p(y_2|y_1)$. Above process is repeated till all K rays in the beam emit <eos> token. A final output of the decoder unit is a ray having a highest value of $p(y_1, y_2, \ldots, y_{T_d})$ in the beam. The beam size is defined as equivalent to the output vocabulary size.

In accordance with an embodiment of the present disclosure, an image post-processing module (102E of FIG. 2) is configured to post-process, at step 310, the set of characters. The step 310 of post-processing comprises combining the set of characters for each of the corresponding sub-image to generate a handwritten text output file, wherein the handwritten text output file is a recognized text version of the scanned handwritten text input image.

In an embodiment, the image post-processing module (102E of FIG. 2) is configured to combine the set of characters in the order in which the set of characters is recognized for each sub-image by the RNN based encoder unit and decoder unit to generate the handwritten text output file.

In accordance with an embodiment of the present disclosure, both the feature extraction module (102B of FIG. 2) and the sequence learning module (102D of FIG. 2) act as connectionist components in the disclosed system 100 for end-to-end handwritten text recognition using neural networks.

In accordance with the present disclosure, the systems and methods for end-to-end handwritten text recognition using neural networks are explained with handwritten text recognition for a single scanned handwritten text image for easy understanding. However the disclosed systems and methods can recognize handwritten text for multiple scanned handwritten text images.

Experimental Results

The disclosed systems and methods for end-to-end handwritten text recognition using neural networks is evaluated on publicly available datasets such as IAM Handwriting Database v3:0 (English), and RIMES Database (French) on Nvidia Tesla K40 GPU, using Character Error Rate (CER) and Word Error Rate (WER) as performance metrics determined as mean over all text lines of the scanned handwritten text input image. A mini-batch gradient descent is employed to speed up the training, and a batch loss is optimized which is a straightforward extension of a sequence loss, calculated as:

$$L = -\frac{1}{M}\sum_{i=1}^{M}\sum_{t=1}^{T_d}(1-p(y_{it}))^\gamma \log(p(y_{it}))$$

Where M is a batch size and $y_{it}$ represents $i^{th}$ timestep of $i^{th}$ instance of the batch. For experiments, the batch size is set to 16. An Adam algorithm is used as an optimizer with a learning rate of 0:001. The disclosed system 100 is trained till to get a test validation accuracy and is achieved after 30 epochs.

Table 3 shows an effect of the Layer Normalization (LN), the Focal Loss technique and the Beam Search decoding algorithm on the disclosed system 100. LN improved performance of a base model of the system 100 by around 3%. Use of the Focal Loss technique also increased accuracy of the system 100 by 1-3% but major improvement is achieved by replacing greedy decoding with the Beam Search decoding algorithm which boosted the accuracy of the system 100 by 4-5%.

TABLE 3

| Methods | IAM | | RIMES | |
| --- | --- | --- | --- | --- |
| | CER (%) | WER (%) | CER (%) | WER (%) |
| Baseline | 17.4 | 25.5 | 12.0 | 19.1 |
| +LN | 13.1 | 22.9 | 9.7 | 15.8 |
| +LN + Focal Loss | 11.4 | 21.1 | 7.3 | 13.5 |
| +LN + Focal Loss + Beam Search | 8.1 | 16.7 | 3.5 | 9.6 |

Table 4 shows a comparison on the accuracy in terms of Character Error Rate (CER) and Word Error Rate (WER) of the disclosed system 100 and method 300 with existing systems and methodologies. Table 5 shows a comparison on an efficiency in terms of maximum GPU memory consumption and number of trainable parameters of the disclosed system and method with existing CNN-1DRNN-CTC model.

TABLE 4

| Methods | IAM | | RIMES | |
| --- | --- | --- | --- | --- |
| | CER (%) | WER (%) | CER (%) | WER (%) |
| 2DLSTM | 8.3 | 27.5 | 4.0 | 17.7 |
| CNN-1DLSTM-CTC | 6.2 | 20.2 | 2.6 | 10.7 |
| Disclosed systems and methods | 8.1 | 16.7 | 3.5 | 9.6 |

TABLE 5

| Methods | Memory (GB) | # of Parameters (Mi) |
| --- | --- | --- |
| CNN-1DRNN-CTC | 10.5 | 9.3 |
| Disclosed systems and methods | 7.9 | 4.6 |

A word level accuracy of the disclosed systems and methods is improved over the existing systems and methodologies, however a character level accuracy is slightly lower in comparison.

In accordance with the present disclosure, the systems and methods for end-to-end handwritten text recognition using neural networks takes input, the sub-image, as a scaled or down sampled version maintaining fixed height in the range from 128 pixels to 32 pixels while the width is adjusted maintaining the aspect ratio of the corresponding sub-image, thereby achieving handwritten text recognition with reduced number of computations and less memory requirements. With the experimental results, a reduction of 61% A in computations and 17% in memory consumption is achieved by down sampling to almost a sixteenth of original size of each sub-image, without compromising with the overall accuracy.

In accordance with an embodiment of the present disclosure, the disclosed systems and methods for end-to-end handwritten text recognition using neural networks achieves significant improvement with the accuracy in handwritten text recognition using the RNN based encoder unit and decoder unit with attention mechanism over existing CNN-1DRNN-CTC model. With experimental results, the disclosed system and method for end-to-end handwritten text recognition using neural networks surpassed on the accuracy over the available datasets, IAM and RIMES by 3:5% and 1:1%, respectively.

In accordance with the present disclosure, the systems and methods for end-to-end handwritten text recognition using neural networks provides a complete end-to end solution for performing efficient offline handwritten text recognition using the scanned handwritten text input images.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for end-to-end handwritten text recognition using neural networks, the system comprising:
   one or more internal data storage devices operatively coupled to one or more hardware processors for storing instructions configured for execution by the one or more hardware processors, the instructions being comprised in:
   an image pre-processing module configured to:
      receive a scanned handwritten text input image;
      obtain one or more sub-images from the scanned handwritten text input image, wherein each of the one or more sub-images comprises a line of handwritten text present in the scanned handwritten text input image; and
      scale the one or more sub-images into one or more scaled sub-images having a fixed height and a variable width and maintaining aspect ratio thereof;
   a feature extraction module operatively coupled to the image pre-processing module and configured to transform each of the one or more scaled sub-images into one or more feature maps by applying a Convolutional Neural Network (CNN), wherein the one or more feature maps contain visual features of a corresponding sub-image;
   a map-to-sequence module operatively coupled to the feature extraction module and configured to convert the one or more feature maps into a sequence of feature vectors by detaching depth-wise, columns comprised in the one or more feature maps and concatenating respective columns of the one or more feature maps of the corresponding sub-image;
   a sequence learning module operatively coupled to the map-to-sequence module and configured to generate one or more set of characters, by mapping the visual features associated with each sequence of feature vectors, using a recurrent neural network (RNN) based encoder unit and decoder unit, wherein the one or more set of characters is a machine readable text recognized for the corresponding sub-image, and wherein an encoder unit of the RNN based encoder unit and decoder unit is configured to generate a context vector for each sequence of feature vectors and a decoder unit of the RNN based encoder unit and decoder unit is configured to apply a conditional probability distribution over the context vector for each sequence of feature vectors, to generate a set of characters for the corresponding sub-image; and
   an image post-processing module operatively coupled to the sequence learning module and configured to combine the set of characters for each of the corresponding sub-image to generate a handwritten text output file, wherein the hand-written text output file is a recognized text version of the scanned handwritten text input image.

2. The system of claim 1, wherein the image pre-processing module is further configured to:
   employ a mini-batch training technique, to maintain uniformity in dimensions by padding the one or more sub-images comprised in a batch with respective background pixels on both left and right sides to match width of a widest sub-image in the batch; and
   introduce random distortions to the one or more sub-images to generate variations in the one or more sub-images.

3. The system of claim 1, wherein the CNN comprises seven convolutional layers stacked serially with leaky ReLU activations, wherein the leaky ReLU activations of the convolution layers are configured by performing:
   batch normalization to prevent internal covariate shift and speed up the training before propagating to a next convolutional layer; and
   pooling operations mechanism to perform on the activation of at least some of the convolutional layers to reduce dimensionality of the one or more sub-images.

4. The system of claim 1, wherein the encoder unit is a bidirectional network formed by combining two Long Short Term Memory (LSTM) cells and the decoder unit is a unidirectional network having a single LSTM cell.

5. The system of claim 4, wherein the encoder unit and the decoder unit comprises two recurrent layers with 256 hidden units in each of the LSTM cells.

6. The system of claim 1, wherein the RNN based encoder unit and decoder unit is configured by:
   facilitating gradient flow to a subsequent recurrent layer through recurrent units comprised therein through residual connections;
   regularizing the encoder unit without modifying recurrent connections to capture long-term dependencies by employing a dropout mechanism along depth-wise connections;
   activating cell neurons to prevent the covariate shift due to minibatch training through a layer normalization; and aligning hidden states of the decoder unit with hidden states of the encoder unit through an attention mechanism.

7. A processor implemented method for end-to-end handwritten text recognition using neural networks, the method comprising the steps of:
pre-processing, by an image pre-processing module, a received scanned handwritten text input image, wherein the pre-processing comprises:
obtaining one or more sub-images from the received scanned handwritten text input image, wherein each sub-image comprises a line of handwritten text present in the scanned handwritten text input image; and
scaling the one or more sub-images into one or more scaled sub-images having a fixed height and a variable width and maintaining aspect ratio thereof;
transforming, by a feature extraction module, each of the one or more scaled sub-images into one or more feature maps by applying a Convolutional Neural Network (CNN), wherein the one or more feature maps contain visual features of a corresponding sub-image;
converting, by a map-to-sequence module, the one or more feature maps into a sequence of feature vectors by detaching depth-wise, columns comprised in the one or more feature maps and concatenating respective columns of the one or more feature maps of the corresponding sub-image;
generating, by a sequence learning module, one or more set of characters, by mapping the visual features associated with each sequence of feature vectors, using a recurrent neural network (RNN) based encoder unit and decoder unit, wherein the one or more set of characters is a machine readable text recognized for the corresponding sub-image, and wherein an encoder unit of the RNN based encoder unit and decoder unit is configured to generate a context vector for each sequence of feature vectors and a decoder unit of the RNN based encoder unit and decoder unit is configured to apply a conditional probability distribution over the context vector for each sequence of feature vectors, to generate a set of characters for the corresponding sub-image; and
post-processing, by an image post-processing module, the set of characters, wherein the post-processing comprises combining the set of characters for each of the corresponding sub-image to generate a handwritten text output file, wherein the hand-written text output file is a recognized text version of the scanned handwritten text input image.

8. The method of claim 7, wherein the step of pre-processing further comprises:
employing a mini-batch training technique, to maintain uniformity in dimensions by padding the one or more sub-images comprised in a batch with respective background pixels on both left and right sides to match width of a widest sub-image in the batch; and
introducing random distortions to the one or more sub-images to generate variations in the one or more sub-images.

9. The method of claim 7, wherein the CNN comprises seven convolutional layers stacked serially with leaky ReLU activations configured by:
a batch normalization to prevent internal covariate shift and speed up the training before propagating to a next convolutional layer; and
a pooling operations mechanism to perform on the activation of at least some of the convolutional layers to reduce dimensionality of the one or more sub-images.

10. The method of claim 7, wherein the RNN based encoder unit and decoder unit is configured by:
residual connections to facilitate gradient flow to a subsequent recurrent layer through recurrent units comprised therein;
a dropout mechanism employed along depth-wise connections to regularize the encoder unit without modifying the recurrent connections to capture long-term dependencies;
a layer normalization to activate cell neurons to prevent the covariate shift due to minibatch training; and
an attention mechanism for aligning hidden states of the decoder unit with hidden states of the encoder unit.

11. A non-transitory computer readable medium storing a computer readable program embodied therein, wherein the computer readable program, when executed on a computing device, causes the computing device to:
pre-process a received scanned handwritten text input image by an image pre-processing module, wherein the pre-process comprises:
obtaining one or more sub-images from the received scanned handwritten text input image, wherein each sub-image comprises a line of handwritten text present in the scanned handwritten text input image; and
scaling the one or more sub-images into one or more scaled sub-images having a fixed height and a variable width and maintaining aspect ratio thereof;
transform each of the one or more scaled sub-images by a feature extraction module, into one or more feature maps by applying a Convolutional Neural Network (CNN), wherein the one or more feature maps contain visual features of a corresponding sub-image;
convert the one or more feature maps by a map-to-sequence module, into a sequence of feature vectors by detaching depth-wise, columns comprised in the one or more feature maps and concatenating respective columns of the one or more feature maps of the corresponding sub-image;
generate one or more set of characters by a sequence learning module, by mapping the visual features associated with each sequence of feature vectors, using a recurrent neural network (RNN) based encoder unit and decoder unit, wherein the one or more set of characters is a machine readable text recognized for the corresponding sub-image, and wherein an encoder unit of the RNN based encoder unit and decoder unit is configured to generate a context vector for each sequence of feature vectors and a decoder unit of the RNN based encoder unit and decoder unit is configured to apply a conditional probability distribution over the context vector for each sequence of feature vectors, to generate a set of characters for the corresponding sub-image; and
post-process the set of characters by an image post-processing module, wherein the post-process comprises combining the set of characters for each of the corresponding sub-image to generate a handwritten text output file, wherein the hand-written text output file is a recognized text version of the scanned handwritten text input image.

* * * * *